United States Patent
McDonough et al.

(10) Patent No.: US 7,366,201 B2
(45) Date of Patent: Apr. 29, 2008

(54) METHOD AND APPARATUS FOR VECTOR BASED SEQUENCE GENERATION

(75) Inventors: John G. McDonough, La Jolla, CA (US); Douglas R. Walby, San Diego, CA (US); Karim Abdulla, Cardiff, CA (US)

(73) Assignee: Texas Instruments Incorporated, Dallas, TX (US)

( * ) Notice: Subject to any disclaimer, the term of this patent is extended or adjusted under 35 U.S.C. 154(b) by 904 days.

(21) Appl. No.: 10/120,954

(22) Filed: Apr. 11, 2002

(65) Prior Publication Data

US 2003/0118050 A1    Jun. 26, 2003

Related U.S. Application Data

(60) Provisional application No. 60/343,160, filed on Dec. 21, 2001.

(51) Int. Cl.
*H04J 13/00* (2006.01)
*H04B 1/69* (2006.01)

(52) U.S. Cl. ........................ 370/479; 375/140

(58) Field of Classification Search ............. 341/50, 341/56, 67, 102, 103, 106; 370/327, 335, 370/441, 470, 479; 375/130, 140, 145, 148, 375/150, 240.23
See application file for complete search history.

(56) References Cited

U.S. PATENT DOCUMENTS

| | | | | |
|---|---|---|---|---|
| 5,515,396 A * | 5/1996 | Dalekotzin | ................... | 375/142 |
| 6,208,615 B1 * | 3/2001 | Faruque et al. | ............. | 370/209 |
| 6,956,890 B2 * | 10/2005 | Lattuca et al. | ............. | 375/140 |
| 2001/0048380 A1 * | 12/2001 | Medlock et al. | ............. | 341/50 |
| 2002/0048313 A1 * | 4/2002 | Garodnick | ................... | 375/130 |
| 2004/0190602 A1 * | 9/2004 | Lomp | ......................... | 375/148 |

\* cited by examiner

*Primary Examiner*—Andrew C. Lee
(74) *Attorney, Agent, or Firm*—Ronald O. Neerings; Wade James Brady, III; Frederick J. Telecky, Jr.

(57) ABSTRACT

A vector-based sequence generator (100) provides for a general architecture that can be easily adapted to any random length sequence and any random number of bits per access. The sequence generator (100) can also produce a new access on every hardware clock cycle, thereby maximizing the efficiency of the bit sequence requesting process.

17 Claims, 3 Drawing Sheets

METHOD AND APPARATUS FOR VECTOR BASED SEQUENCE GENERATION

This application claims priority under 35 USC § 119(e)(1) of provisional application Ser. No. 60/343,160, filed Dec. 21, 2001.

TECHNICAL FIELD

This invention relates in general to the field of radio communications and more specifically to a method and apparatus for vector-based sequence generation.

BACKGROUND

In modern Direct Sequence Spread Spectrum (DSSS) communication systems, the spreading, modulation and coding schemes used may vary from one operational mode to another and from one network to another. In addition, certain communication devices may be required to operate across multiple networks that have adopted different and perhaps incompatible communication systems (i.e., multi-mode operation).

As it is desirable to build receivers that may operate in a multitude of different modes and within multiple networks and systems, a flexible and modular method and apparatus for sequence generation is desired that will accommodate different spreading, modulation and coding schemes in an efficient manner (e.g., having significant sharing of hardware and software resources between the various modes of operation and between different systems). In particular, the ability to efficiently generate maximal length (ML) pseduonoise (PN) sequences used in certain communication systems is desirable.

It is also desirable to provide a flexible and efficient interface to the sequence generator so that the number of sequence bits provided per access can be varied to match the requirements of the requestor. Thereby reducing the number of requests per time interval.

DSSS receivers have traditionally been capable of demodulation in only a single or perhaps a few modes of operation and do not typically have the flexibility to accommodate a variety of spreading, modulation and coding schemes. For example, mobile station receivers compliant with the TIA/EIA-IS-95-B standard are required to generate only a single set of modified ML sequences for de-spreading purposes.

As is well known in the art, ML sequences are traditionally generated with PN generators that make use of Linear Feedback Shift Registers (LFSRs). An LFSR has a shift register of N stages and intervening exclusive-OR gates for programming a specific PN sequence. A subset of the PN sequences generated by an N-stage LFSR are characterized as ML PN sequences, and are of length $2^N-1$.

A need exists in the art for a method and apparatus that can be easily adapted to any random length sequence and any random number of bits provided per access. It should also preferably provide the additional benefit of being capable of producing a new access on every clock cycle, thus maximizing the efficiency of the bit sequence requesting process.

BRIEF DESCRIPTION OF THE DRAWINGS

The features of the present invention, which are believed to be novel, are set forth with particularity in the appended claims. The invention, may best be understood by reference to the following description, taken in conjunction with the accompanying drawings, in the several figures of which like reference numerals identify like elements, and in which:

DETAILED DESCRIPTION OF THE PREFERRED EMBODIMENT

Figure 1:
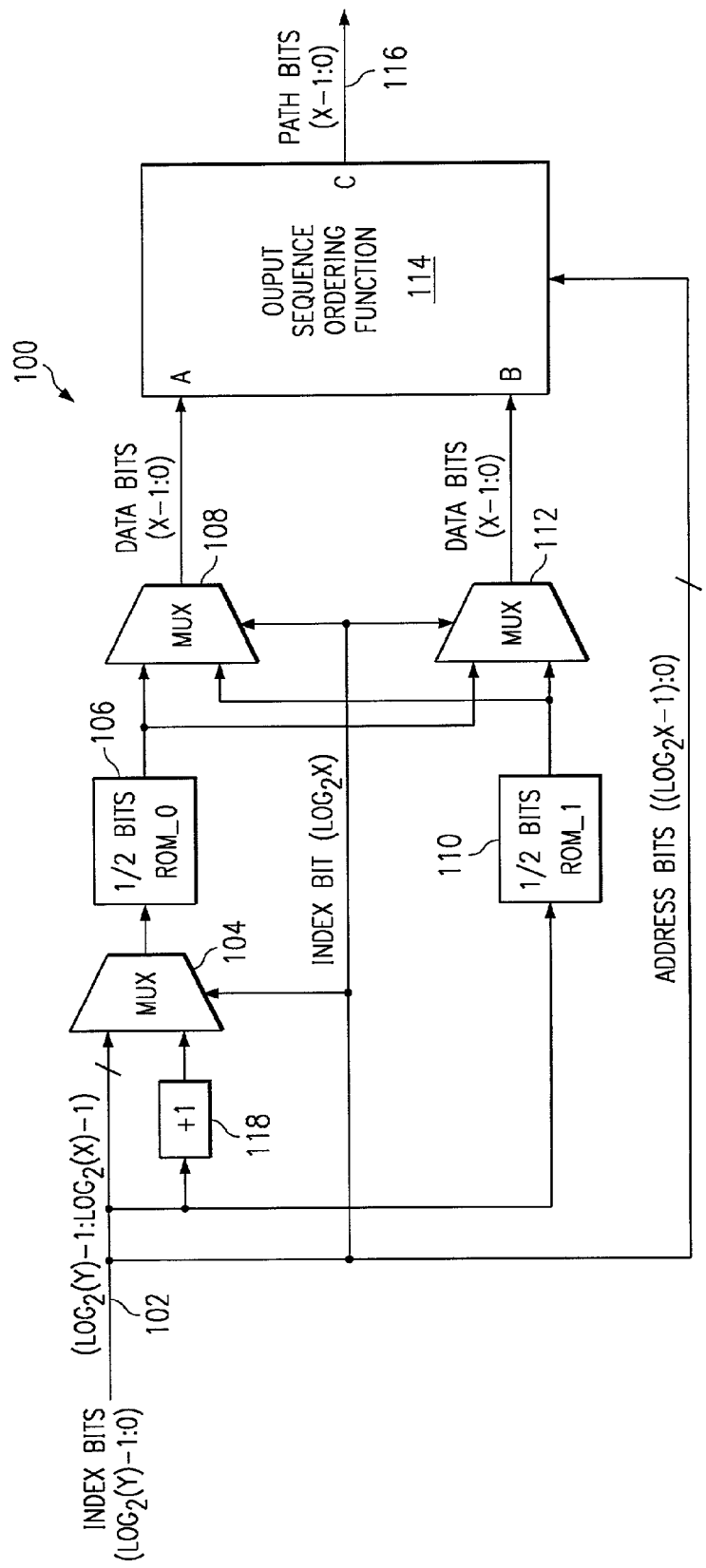
FIG. 1 is a block diagram of a circuit that can select an x-bit sequence from a length-y sequence in accordance with the invention.

While the specification concludes with claims defining the features of the invention that are regarded as novel, it is believed that the invention will be better understood from a consideration of the following description in conjunction with the drawing figures.

Figure 2:
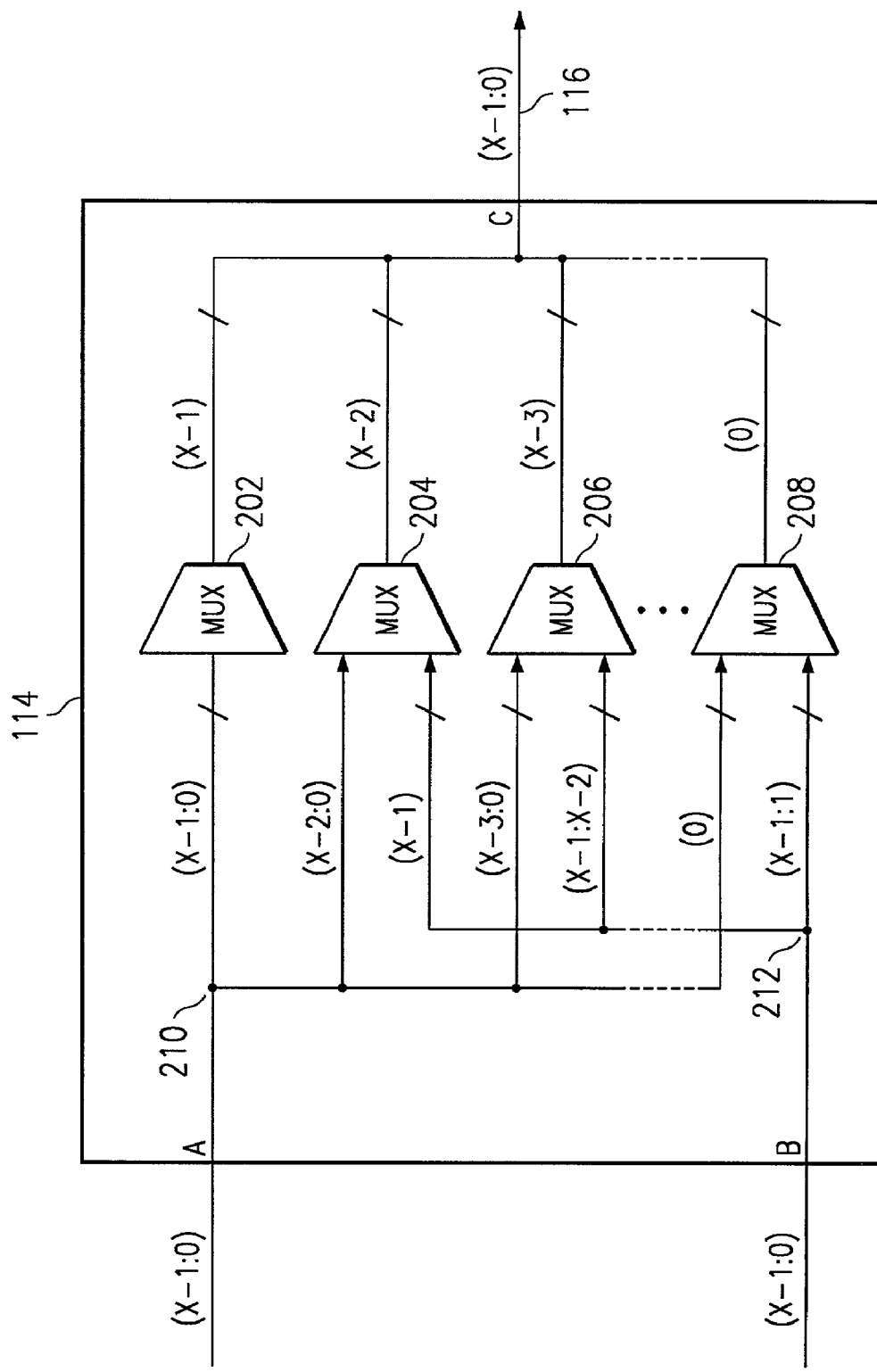
FIG. 2 a more detailed schematic of the output sequence ordering function circuit shown in FIG. 1.
Figure 3:
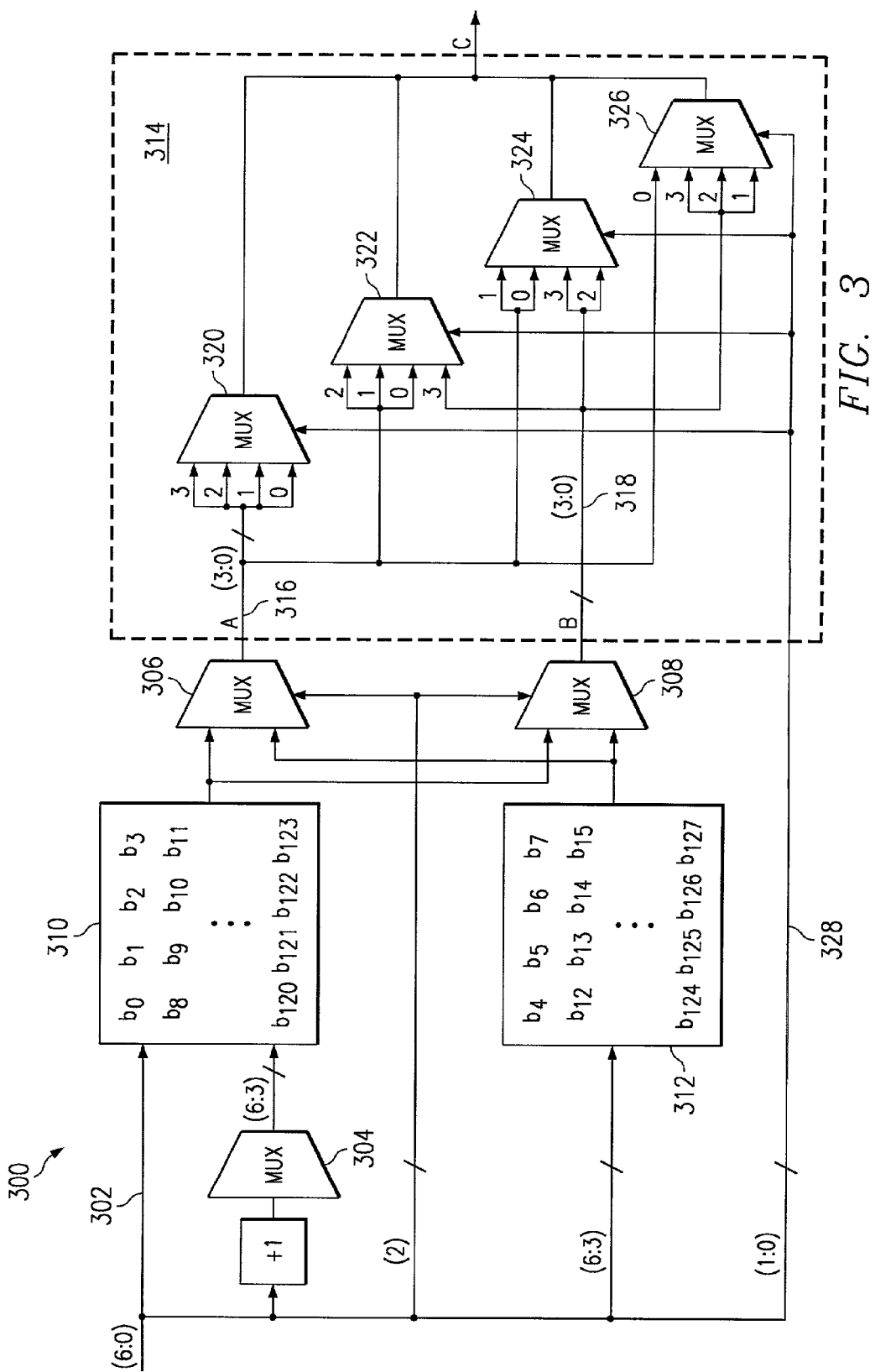
FIG. 3 shows an example of the architecture of the present invention in the particular case of a circuit that can select any 4-bit sequence from a 128-bit length sequence.

Referring now to the drawings and in particular to FIGS. 1 and 2, there is shown a general architecture for the circuit that can implement any particular sequence length (Y) and present that sequence data to the user using any output vector size (N). In FIG. 3, there is shown a specific implementation where the sequence length has been chosen to be 128 bits and the output vector size is 4 bits.

The bit pattern of the pre-defined sequence is stored in a memory storage area, preferably a Read-Only Memory (ROM) and is divided into two individually accessible banks 106, 110, each bank containing half of the bits in the sequence. To make addressing simpler, each word in the ROM preferably contains X bits, where X is a power of 2 that is greater than or equal to N, although this is not a requirement in accordance with the invention. Configuring the data in N-bit words, where N is not a power of 2 would unnecessarily complicate the ROM address calculation without providing any other benefit.

The bits are preferably ordered in the two ROMs 106, 110 such that address A of the first ROM bank 106 contains bits $X*(2*A)$ thru $X*(2*A+1)-1$ of the sequence, while address A of the second ROM bank 110 contains bits $X*(2*A+1)$ thru $X*(2*(A+1))-1$. Each ROM outputs X bits per access. By partitioning the data in this manner, and allowing two ROMs 106, 110 to be accessed on the same clock cycle, it is possible to simultaneously access from the two ROMs a contiguous bit pattern of length 2*X bits, from which an N-bit output sequence can be extracted by the output sequence ordering function block 114. The output of ROMs 106, 110 are multiplexed by multiplexers (MUX) 108 and 112 so that the 2 individual X-bit patterns can be arranged in either of the two different first/last orientations when concatenated into a single 2X-bit sequence. The outputs of MUXs 108, 112 are provided to the output sequence ordering function block 114 that performs the necessary bit ordering prior to providing the output path bits 116.

A two-ROM 106, 110 implementation is the most efficient in terms of hardware simplicity, but the invention can be extended to a larger number of ROMs for reasons such as power consumption. In that case, the same amount of data can be divided between a larger number of ROMs. Since only two of the ROMs are ever accessed simultaneously, and each ROM is smaller, less power is consumed per access than with using two larger ROMs as shown in FIG. 1. The data ordering function block 114 that operates on the ROM outputs would become slightly more complicated if more than two ROMs are used.

Based on the desired starting bit location in the sequence, an X-bit sequence is extracted and provided to the output port 116 by the output sequence ordering function block 114 which is shown in more detail in FIG. 2. In this embodiment, the multiplexer-based output sequence ordering function block 114 has its connections arranged such that any of the X different X-bit sequences in the 2X-bit sequence may be selected and provided to the output port 116. The particular ordering is based on a control field derived from the index value of the first bit in the desired output sequence. The multiplexers 202-208 allow any of the possible X-bit sequences to be available within a single clock cycle. With the ROM data orientation that was previously described, it is theoretically possible to extract either X different sequences of X+1 bit each, or X+1 different sequences of X bit each. From an implementation standpoint, neither of those options is desirable because it would add complexity without adding any functional benefit.

The input to the output sequence ordering function block 114 is controlled by a pair of multiplexers 108, 112 (shown in FIG. 1) that order the two X-bit sequences read from the ROMs 106, 110. Those two multiplexers, plus the multiplexer 104 (shown in FIG. 1) that selects the address for ROM 106, are designated "first/last" multiplexers. If the desired starting bit is located in ROM 106, then the data read from ROM 106 is provided to port A 210 as the first X-bit word, and the data read from ROM 110 is provided to port B 212 as the last X-bit word. If the desired starting bit is located in ROM 110, then the first/last connections are reversed, and the address to ROM 106 is incremented by one by circuit 118 because the X bits read from ROM 106 would be at the next address. This ROM access scheme is capable of presenting any contiguous bit pattern of length 2*X bits to the inputs of block 114. The hardware of block 114 allows the X-bit output pattern to be selected from any starting point within the 2X bit sequence read from the ROM pair. The bit sequence stored in the ROMs can be any type of sequence typically used for Direct Sequence (DS) spreading, for example, pseudonoise (PN), Quasi-orthogonal functions, etc.

Referring now to FIG. 3, an illustrative vector-based sequence generator 300 is provided as an example in order to better understand the functioning of the present invention. The particular implementation shown in FIG. 3 selects a 4-bit sequence (N=4) out of a 128-bit length sequence (Y=128). A 7-bit index value 302 is used to select the desired starting bit location in the 128-bit sequence, given that the index range 0-127 requires 7 bits to represent ($\log_2(Y)$). The various bits of the index are used to index and control the various elements of the invention. In this case since N is an even power of 2 the ROM bit width (X) is equal to N that is 4. The ROM orientation has broken the Y-bit sequence into groups of X bits (128-bit sequence broken into 32 groups of 4 bits, 16 addresses in each of the two ROMs). The highest order bits of the index value 302 (bits $\log_2(Y)-1$ down to $\log_2(X)+1$) are used to address the ROMs In this case those bits are 6 down to 3. Bit 2 ($\log_2(X)$) is used to control the "first/last" multiplexers 304, 306 and 308. If the value of bit 2 is a logical zero, the first bit in the sequence will be contained in the word read from ROM 310 and the remaining bits will be contained in the word read from the same address of ROM 312. If the value of bit 2 is a logical 1, the first bit in the sequence will be contained in the word read from ROM 312, and the remaining bits will be contained in ROM 310, but at the next address location. The effect of the "first/last" multiplexers 304, 306 and 308 is to increment the address applied to ROM 310 and reverse the connections to the A 316 and B 318 input ports of the output sequence ordering function block 314. Finally, the lowest bits ($\log_2(X)-1$ down to 0) of the index are used to configure the multiplexers 320, 322, 324 and 326 in the output sequence ordering function. In this case those bits are 1 down to 0 and they select which of the four bits in the first word is the starting bit in the desired 4-bit sequence.

A simple pair of examples using index values of "0000001" and "0000101" will illustrate the above concepts. In the case of the index value "0000001" (we want 4 bits starting at bit 1) both ROMs 310 and 312 are addressed at the "0" location because bits (6:3) are "0000" and bit 2 is "0". The ROM 310 value is input to the A port 316 of the output sequence ordering function circuit 314, and the ROM 312 value is input to the B port 318. This provides the bits b0, b1, b2, b3, b4, b5, b6, and b7 to the output ordering function circuit 314. Then using the two bits, bit locations 1:0, of the index 302 to select the output ordering, we have the value "01" applied as the multiplexer output control signal 328.

The output multiplexers 320-326 are controlled as follows:

1). If the output control signal 328 value is "00", the top input to each of the four multiplexers 320, 326 is selected;

2). If the output control signal 328 has a value of "01", the next multiplexer input down is selected to go to the ouput;

3). If the output control signal 328 has a value of "10", the third input from the top for each of the multiplexers 320-326 is selected to proceed to the output; and 4). If the output control signal 328, has a value of "11" the bottom input to each multiplexer is selected.

The numbers associated with the inputs to the output multiplexers 320-326 represent the bit positions of the values applied to the A 316 and B 318 inputs. Thus, the output bits selected in this example are b1, b2, b3 and b4 as desired by the index value of "0000001".

For the case of an index value of "0000101", the only thing that is different is bit 2 of the index value is now "1" rather than "0" as it was in the other cases. This causes the address to ROM 310 to be "0001" instead of "0000" while the address to ROM 312 remains "0000". Also, the ROM 310 value is input to the A port 316 of the output function circuit 314, and the ROM 310 value is input to port B 318. Based on the value of the bits in locations 1:0 of the index, the output sequence generated by this index value is b5, b6, b7, b8 as desired.

In the general case, if the sequence length is defined as Y, and the output vector size is N, the following relationships apply for the bit widths of the various elements in the invention when the two-ROM implementation is chosen. The present invention is expandable to any value of N and/or Y. There are $\log_2(Y)$ starting bit location index bits. If Y is not a power of 2, then the number of starting bit location index bit is $\log_2$ (the next power of 2 greater than Y). Starting bit location index bits $\log_2(Y)$ down to $\log_2(N)+1$ are used to address the ROMs. If N is not a power of 2, then the number of bits per address (X) is a power of 2 greater than N. Starting bit location index bit $\log_2(X)$ is used to control the "first/last" multiplexers. Starting bit location index bits $\log_2(X)-1$ down to 0 are used to control the output sequence ordering function multiplexers.

For implementations where more than two ROMs are used, the same number of starting bit location index bits are required, but their allocation to ROM addressing and output ordering changes slightly. For someone having ordinary skill in the art, the adaptations required for those alterations are minimal since the concepts involved are consistent with those of the two ROM implementation described herein.

The present invention provides several advantages including that the number of bits provided per request cycle is variable, thereby maximizing the efficiency of each request cycle. Also, any starting point in the sequence can be accessed within a single clock cycle. A new sequence with a new starting point may be accessed every clock cycle, and requests can be serviced at a rate of one request per clock cycle, maximizing data throughput rates.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims. For example, instead of using ROMs as the storage devices, other storage devices known in the art can be used instead.

What is claimed is:

1. A vector based sequence generator providing an N-bit output sequence from a Y-bit length sequence, comprising:
   an input port for receiving an X-bit length index signal used for selecting the desired starting bit location in the Y-bit length sequence;
   at least first and second simultaneously accessible storage areas coupled to the input port;
   an output sequence ordering function circuit coupled to the at least first and second storage areas, the output sequence ordering function circuit having an output port for providing the N-bit output sequence; and
   some of the bits from the X-bit length index signal are used to simultaneously address the at least two storage areas, and some other bits from the X-bit length index signal are used to configure the output sequence ordering function circuit in order to select the bit order for the N-bit output sequence.

2. A vector based sequence generator as defined in claim 1, wherein the at least two storage areas comprise two Read-Only memories (ROMs).

3. A vector based sequence generator as defined in claim 1, wherein the output sequence ordering function circuit comprises a plurality of multiplexers controlled by one or more bits from the X-bit length index signal.

4. A vector based sequence generator as defined in claim 2, further comprising:
   a multiplexer coupled between the input port that receives the X-bit length index signal and one of the ROMs.

5. A vector based sequence generator as defined in claim 4, further comprising:
   a circuit for adding one to the index signal coupled between the input port and the multiplexer.

6. A vector based sequence generator as defined in claim 2, further comprising at least one multiplexer coupled between the two ROMs and the output sequence ordering function circuit.

7. A vector based sequence generator as defined in claim 6, wherein the at least one multiplexer coupled between the two ROMs and the output sequence ordering function circuit is controlled by some of the bits from the X-bit length index signal.

8. A vector based sequence generator as defined in claim 7, wherein the bits from the X-bit length index signal used to control the at least one multiplexer coupled between the two ROMs and the output sequence ordering function circuit are different than the bits used to address the two ROMs or the configure the output sequence ordering function circuit.

9. A vector based sequence generator as defined in claim 2, wherein the two ROM's can be simultaneously accessed to provide a contiguous bit pattern of length 2*X bits from which the N-bit output sequence can be extracted by the output sequence ordering function circuit.

10. A vector based sequence generator as defined in claim 2, wherein bits are ordered in the two ROMs such that an address "A" of one of the ROMs contains bits bits X*(2*A) thru X*(2*A+1)−1 of the sequence, while address "A" of the other ROM 110 contains bits X*(2*A+1) thru X*(2*(A+1))−1.

11. A vector based sequence generator as defined in claim 10, wherein the two ROMs provide outputs that are multiplexed by two multiplexers so that the two individual X patterns provided by the two ROMs can be arranged in either of two different first/last orientations when concatenated into a single 2X-bit sequence.

12. A method for vector based sequence generation providing an N-bit output from a Y-bit length sequence, comprising the steps of:
   a) receiving an index value having a predetermined number of bits;
   b) using the index value to select the desired starting bit location in the Y-bit length sequence;
   c) using some of the bits of the index value to simultaneously address at least two different storage areas;
   d) using some of the bits of the index value other than those used in step c) in order to control where the outputs of the at least two different storage areas are directed; and
   e) using some of the bits of the index value other than those used in steps c) and d) to control an output sequence ordering function that provides the N-bit output.

13. A method as defined in claim 12, wherein the output sequence ordering function comprises a plurality of multiplexers.

14. A method as defined in claim 12, wherein the at least two storage areas comprise two Read-Only memories (ROMs).

15. A method as defined in claim 14, further comprising the step of:
   simultaneously accessing the two ROMs to provide a contiguous bit pattern of length 2*X bits from which the N-bit output sequence can be extracted by the output sequence ordering function.

16. A method as defined in claim 14, further comprising the step of:
   ordering bits in the two ROMs such that an address "A" of one of the ROMs contains bits X*(2*A) thru X*(2*A+1)−1 of the sequence, while address "A" of the other ROM 110 contains bits X*(2*A+1) thru X*(2*(A+1))−1.

17. A method as defined in claim 16, further comprising the step of:
   multiplexing the two ROM outputs so that the two individual X patterns provided by the two ROMs can be arranged in either of two different first/last orientations when concatenated into a single 2X-bit sequence.

* * * * *